F. E. BRIGHT.
CHUCK.
APPLICATION FILED APR. 23, 1917.
1,327,194.
Patented Jan. 6, 1920.
2 SHEETS—SHEET 1.
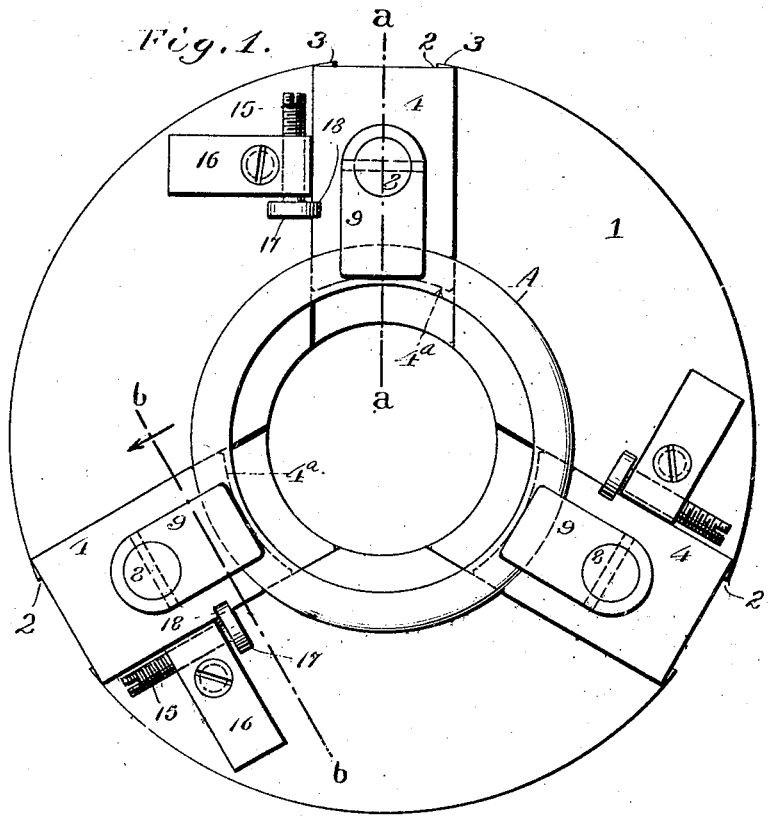
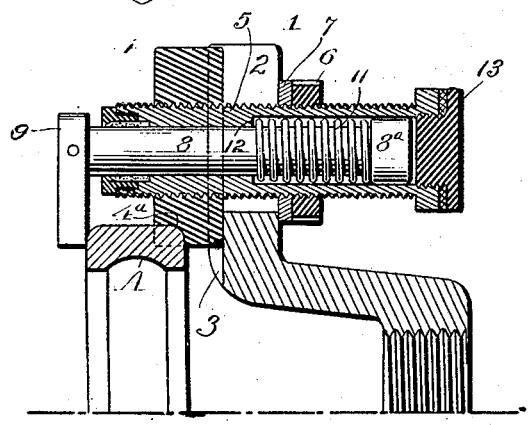
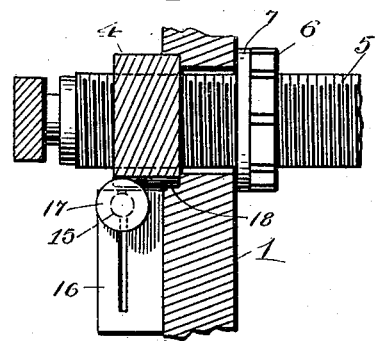
Inventor
F. E. Bright
By Attorneys
Rogers, Kennedy & Campbell F. E. BRIGHT.
CHUCK.
APPLICATION FILED APR. 23, 1917.
1,327,194.
Patented Jan. 6, 1920.
2 SHEETS—SHEET 2.
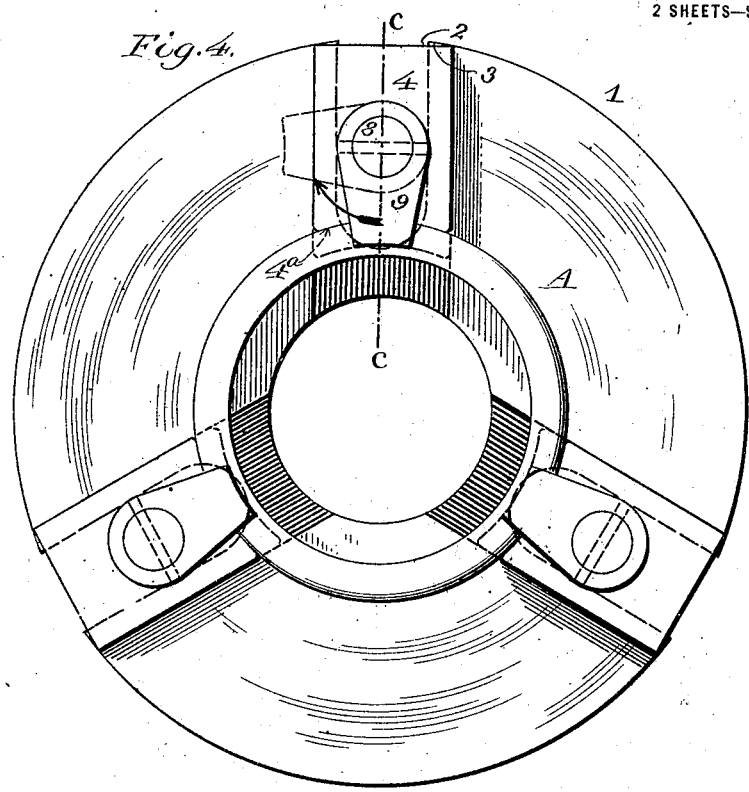
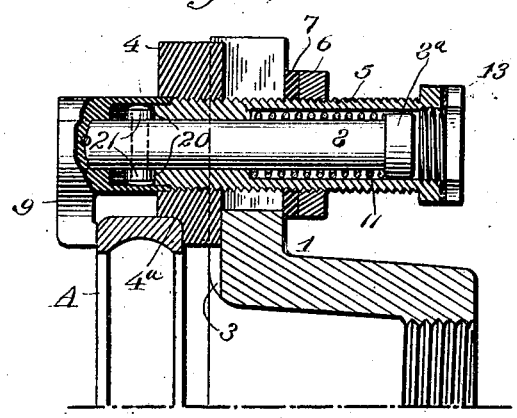
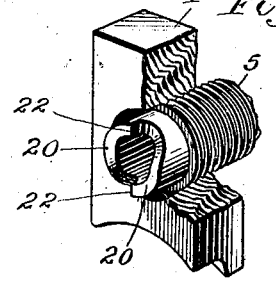
Inventor
F. E. Bright
By his Attorneys
Rogers, Kennedy & Campbell

UNITED STATES PATENT OFFICE.

FRED E. BRIGHT, OF PHILADELPHIA, PENNSYLVANIA.

CHUCK.

1,327,194.     Specification of Letters Patent.     Patented Jan. 6, 1920.

Application filed April 23, 1917. Serial No. 163,824.

*To all whom it may concern:*

Be it known that I, FRED E. BRIGHT, a citizen of the United States, residing at Philadelphia, in the county of Philadelphia and State of Pennsylvania, have invented certain new and useful Improvements in Chucks, of which the following is a specification, reference being had therein to the accompanying drawing.

This invention relates to work holding chucks designed more particularly for use in connection with work pieces of annular form such as rings, cylinders, and the like, and adapted to clamp the exterior of the work and thereby expose its inner surface, so that the latter may be subjected to forming, shaping, grinding, finishing or like operations.

The invention has special reference to chucks for handling the casing rings of antifriction bearings, which rings must be formed and finished with extreme accuracy, more particularly as to their internal surface, and my improved chuck is of a construction and form which will hold the work in true centered relation to the axis of the chuck, and in accurate parallelism with the face or plane of the same.

The invention is characterized by the provision of work holding jaws which are movable in one direction, (in the particular embodiment of the invention illustrated, axially,) to clamp the work facewise of the chuck body, and are movable also in another direction angularly related to the direction of clamping movement, (in the present instance laterally of said clamping movement) so as to free the work and permit its ready removal and application.

In the more specific embodiment of the invention, the clamping jaws, capable of the two movements mentioned, are sustained by jaw supports mounted on the chuck body, which are adjustable radially thereof, and which are provided with work seats so that by the adjustments of the supports, rings of different diameters may be held in centered relations to the chuck, the mounting of the jaws on the supports being such that the jaws may be adjusted axially, whereby work pieces of different thicknesses may be accommodated.

The invention consists also in the details of construction and combination of parts hereinafter described and claimed.

In the accompanying drawings:

Figure 1 is a front face view of my improved chuck in one form, showing an antifriction bearing ring held thereby.

Fig. 2 is a longitudinal sectional elevation through one side of the same on the line *a—a* of Fig. 1.

Fig. 3 is a transverse sectional elevation on the line *b—b* of Fig. 1.

Fig. 4 is a front face view of my improved chuck in slightly modified form.

Fig. 5 is a longitudinal sectional elevation through one side of the same on the line *c—c* of Fig. 4.

Fig. 6 is a fragmentary perspective view of a portion of a jaw support and jaw carrier showing the cams on the latter.

Fig. 7 is a perspective view of one of the clamping jaws proper and its connected operating stem, parts being broken away to expose other parts to view, and said parts being formed and adapted to coöperate with the cams on the jaw carrier shown in Fig. 6.

Referring to the drawings:

Referring more particularly to Figs. 1, 2 and 3, 1 designates a chuck body of general circular form and suitably constructed to be supported for rotation about its central axis. The body is provided with radial slots 2 (in the present instance three in number) which extend from the outer edge of the body some distance inwardly, the front face of the body at the opposite edges of the slots being formed with radial guiding grooves 3. 4 designates clamping-jaw supports in the form of rectangular blocks which are mounted in the guiding slots 3 and which are adjustable radially on the chuck body independently of each other in the manner and for the purpose to be more particularly described hereinafter, the inner ends of said supports being provided with arcuate grooves 4ª forming work seats to receive the work piece, in the present instance the ring A. 5 designates clamping-jaw carriers, one sustained by each of the jaw supports, and each carrier consisting of an externally threaded tubular sleeve screwed into a threaded opening in the jaw support 4, the sleeve having screwed on it at the rear side of the chuck body, a nut 6 which engages a washer 7 bearing against the body at the sides of the radial slot 2, this nut serving, when screwed up, to draw the jaw support rearwardly in its guides and hold the same fixedly in position relatively to the chuck body, with the sleeve extending axially of the body and exposed at its forward and rear ends respectively in front of the seat and in rear of the chuck body. Extending longitudinally within the tubular sleeve 5 is a clamping-jaw stem 8 having on its rear end a head 8ª, and having on its forward end which projects beyond the end of the tubular sleeve, a clamping jaw proper 9 in the form of a plate firmly fastened in fixed relation to the stem. As a result of the construction described, the stems are movable axially within the sleeves, and are also rotatable therein, the form, construction and relation of the parts being such that when the jaws are turned to their inner position as shown in Figs. 1 and 2, they will overhang the outer side of the work piece, and when moved rearwardly in an axial direction, will engage the same with a clamping action and thereby confine the work piece against its seat on the supports 4. When the stems are moved forwardly the jaws will disengage the work, and the jaws being swung laterally about the axes of the stems as centers, the work will be freed and be permitted to be removed from the chuck in facewise direction. Each stem is acted on by an expansion spring 11 which encircles the rear end of the stem within the tubular sleeve, the rear end of the spring bearing against the head 8ª on the stem and its forward end bearing against an annular shoulder 12 on the sleeve, the tendency of the spring being to urge the stem rearwardly with yielding force and thereby cause the jaw to clamp the work with a yielding pressure. The action of the jaws in clamping the work in place with yielding pressure is particularly advantageous in holding work pieces of a delicate nature which, if held by a positive clamping action, would be liable to distortion and injury.

By mounting the carrier sleeves in the jaw supports 4 in the manner described, these sleeves are adjustable in a direction axially of the chuck body, the purpose of this adjustment being to enable work pieces of different thicknesses to be acted on. The adjustment is effected by first unscrewing the confining nut 6 to release the sleeve, whereupon the latter may be screwed by means of a head 13 on the rear end of the sleeve, in either direction to move the sleeve forwardly or rearwardly as the case may be; and when the sleeve has been brought to the proper position, the confining nut is again tightened up to hold the sleeve in fixed position.

The adjustment of the jaw supports radially in order to carry the work seats to or from the center and thus accommodate work pieces of different diameters and center the same, is effected by means of adjusting screws 15, one for each jaw support, and each screw extending radially at the side of its associated jaw support, and being threaded in a radially extending hole in the end of a lug 16 fixed to the face of the chuck body. The inner end of the screw is provided with a head 17 engaging loosely in a slot 18 in the edge of the jaw support, and its outer end is formed with a slot for turning it. By turning the screw in the threaded opening, it will be caused to travel inwardly or outwardly according to the direction of turning movement, and engaging in the slot in the support the latter will be correspondingly adjusted, thereby carrying with it the jaw carrier and the clamping jaw sustained thereby. It is understood that in making this adjustment, the confining nut 6 is first unscrewed in order to release the support from its clamped position in its guides.

The operation of the jaws to enable the work piece to be set in position and to be clamped, is manually effected by grasping the jaws proper and swinging them outwardly so as to expose the work seat. The work is then set in place on the work seat by which it will be accurately centered, and the jaws are then swung inwardly and released, whereupon the actuating springs will force the jaw stems rearwardly and cause the jaws to bind with yielding pressure against the front side of the work, and thereby clamp the same against the work seat in a direction facewise of the chuck body. In releasing the work to permit its removal, the jaws are grasped and drawn forwardly against the force of the springs to disengage the work, and are then swung outwardly to their outer inactive positions so as to free the work, whereby the latter may be removed in facewise direction from the work seat.

It is to be noted that the jaws may be swung laterally into an inoperative position instantly and without the necessity of releasing any parts to permit the jaws to be moved. This results from the fact that the jaws are mounted so as to be freely movable in an axial direction, except as to the restraining action of the springs, to disengage the work, and also freely movable in a lateral direction to free the work.

Instead of drawing the jaws forwardly to disengage the work, I propose, as shown in Figs. 5, 6 and 7, to effect this forward motion automatically by the swinging movement of the jaws to free the work. This action may be effected by mechanisms of different forms and constructions, but I prefer to provide on the forward ends of the tubular sleeves two cam surfaces 20 which are engaged respectively by lugs 21 fixed to and projecting from the diametrically opposite sides of the stem 8 and held in engagement with the cam surfaces by the spring 11. These cam surfaces are of such form that when the jaw is swung in one direction (clockwise in the present instance) the stem will be thrust forwardly and will move the jaw outwardly and thereby disengage the work, the said cam surfaces being formed with stop shoulders 22 against which the lugs on the stem bear when the jaw is in its inward active clamping position, and which prevent the jaw from being swung in an anticlockwise direction. The purpose of thus confining the jaws to swinging movement in one direction, is to prevent the jaws from turning when in clamping position, in the event of the work slipping around in the rotary motion of the chuck.

In the foregoing description and accompanying drawings I have set forth my invention in the particular detailed forms which I prefer to adopt and which in practice have been found to answer to a satisfactory degree the ends to be attained. It will be understood, however, that these details may be variously changed and modified without departing from the spirit of my invention; and further it will be understood that the invention is not limited to any particular form or construction of the parts except in so far as such limitations are specified in the claims.

Having thus described my invention, what I claim is:

1. In a work holding chuck, the combination of a chuck body provided with a work seat, a jaw carrier sustained by the chuck body and adjustable relatively thereto axially of the chuck, a stem mounted on the jaw carrier and provided with a clamping jaw, said stem being movable back and forth relatively to the carrier to a limited extent axially of the chuck, and a spring sustained by the carrier and acting on the stem to move it relatively to the carrier to clamp the work.

2. In a work holding chuck, the combination of a chuck body provided with a work seat, a jaw carrier sustained by the chuck body and adjustable relatively thereto axially of the chuck, a stem rotatably mounted in the jaw carrier and provided with a clamping jaw, said stem being movable back and forth to a limited extent relatively to the carrier and axially of the chuck, and a spring sustained by the carrier and acting on the stem to move it axially relatively to the carrier to clamp the work.

3. In a work holding chuck, the combination of a chuck body, a clamping jaw sustained thereby and movable axially to clamp the work facewise of the said body, said jaw being movable laterally relatively to its clamping action to free the work, and means controlled by the lateral movement of the jaw for moving the same axially to disengage the work.

4. In a work holding chuck, the combination of a chuck body, a clamping jaw having an axially extending stem rotatably mounted on the body and movable axially thereof to cause the jaw to clamp the work, and a cam sustained by one of said parts and engaged by the other part and adapted when the stem is rotated to automatically move the same axially to cause the jaw to disengage the work.

5. In a work holding chuck, the combination of a chuck body, a tubular jaw carrier sustained thereby, a work clamping jaw having a stem movable longitudinally in said carrier, and a spring surrounding the stem within the carrier and bearing respectively against the carrier and the stem, said spring acting to force the jaw in yielding engagement with the work.

6. In a work holding chuck, the combination of a chuck body, an axially extending tubular jaw carrier mounted in the body and adjustable axially thereof, an axially movable stem extending within the tubular carrier with its forward end projecting beyond the forward end of the carrier, a clamping jaw on the forward end of the stem adapted when the stem is moved rearwardly to clamp the work and adapted when moved forwardly to disengage the work, and a spring encircling the stem within the carrier and acting respectively on the stem and carrier to urge the stem rearwardly.

7. In a work holding chuck, the combination of a chuck body, a tubular jaw carrier sustained thereby, a clamping jaw having a stem rotatably mounted in said carrier for longitudinal movement therein, and a spring surrounding the same within the carrier and bearing respectively against the carrier and the stem and acting to force the jaw into yielding engagement with the work.

8. In a work holding chuck, the combination of a body, a jaw support sustained thereby and adjustable radially thereof, an axially extending jaw carrier sustained by the support and adjustable relatively thereto in an axial direction, a stem rotatably mounted in the tubular carrier with its forward end extended beyond the forward end of the carrier, said stem being movable axially relatively to the carrier, a clamping jaw on the projecting end of the stem, and a spring acting on the stem and carrier respectively and tending to move the jaw rearwardly to clamp the work.

In testimony whereof, I have affixed my signature.

FRED E. BRIGHT.